United States Patent [19]

Ohnemuller et al.

[11] 3,861,935

[45] Jan. 21, 1975

[54] SYNTHETIC CRYSTALLINE BETA-WALLASTONITE PRODUCT

[76] Inventors: Walter Ohnemuller, 509 Leverkusen, am Barsberg 17, Leverkusen; Alexander Solf, 506 Bensberg Refrath Uurfet 106, Bensberg-Refrath, both of Germany

[22] Filed: Mar. 10, 1970

[21] Appl. No.: 18,342

[30] Foreign Application Priority Data
Mar. 12, 1969 Germany............................ 1912354

[52] U.S. Cl.................... 106/306, 423/331, 106/39, 106/241
[51] Int. Cl........................... C01b 33/24, C09c 1/28
[58] Field of Search................... 23/110 R; 106/306; 423/331

[56] References Cited
UNITED STATES PATENTS

| | | | |
|---|---|---|---|
| 3,264,130 | 8/1966 | Mays............................ | 23/110 R X |
| 3,316,116 | 4/1967 | Podschus........................... | 106/306 |
| 3,552,915 | 1/1971 | Rostoker.......................... | 23/110 R |

FOREIGN PATENTS OR APPLICATIONS

| | | | |
|---|---|---|---|
| 565,592 | 11/1958 | Canada................................. | 23/110 |
| 1,046,586 | 10/1966 | Great Britain....................... | 23/110 |
| 783,712 | 9/1957 | Great Britain....................... | 23/110 |
| 588,659 | 12/1959 | Canada................................. | 23/110 |
| 848,933 | 9/1960 | Great Britain....................... | 23/110 |

*Primary Examiner*—Edward Stern
*Attorney, Agent, or Firm*—Gerard Weiser; Alfred Stapler; Karl L. Spivak

[57] ABSTRACT

Substantially pure, synthetic crystalline $\alpha$-wollastonite having a specified BET surface of 1–30 m$^2$/g made by first producing calcium silicate hydrates having a molar ratio of SiO$_2$:CaO = about 0.7 to about 1.3 by hydrothermal treatment of an aqueous mixture of a source of CaO and SiO$_2$ and then annealing the calcium silicate hydrates at about 800°C to about 1150°C to convert them to the $\alpha$-wollastonite. The invention also encompasses the use of the calcium silicate hydrates and the $\alpha$-wollastonite in the manufacture of ceramic materials and glazings.

1 Claim, No Drawings

SYNTHETIC CRYSTALLINE BETA-WALLASTONITE PRODUCT

This invention relates to a synthetic wollastonite and a method of making the same.

Wollastonite, calcium metasilicate $CaSiO_3$, is a contact mineral formed in nature primarily by the resorption of calc-spar and exists in two modifications, viz, $\beta$-wollastonite (triclinic) with a fusion point <1160°C and $\alpha$-wollastonite (pseudohexagonal) with a fusion point >1160°C.

Workable deposits of the mineral are found, for example, in the United States and Finland. The natural deposits are substantially impure. Wollastonite is, however, available commercially with about 5% impurities. Wollastonite is also found in admixtures with other substances as in siliceous rocks, blast furnace slags, slags from Siemens-Martin furnaces and devitrifications from glass. Mixtures of both the $\alpha$ and $\beta$ modifications are formed by the thermal dehydration of calcium hydrosilicates.

So-called synthetic wollastonite, known in the art, is made by thermal interaction of CaO and $SiO_2$ and comprises either predominantly a glass phase consisting of cristobalite and quartz or is roentgenamorphous having a smaller glass phase of up to about 25%. These synthetic wallastonites are useful in ceramics and road construction compositions and are generally formulated and worked into these compositions in the same manner as the natural wollastonites.

The use of natural wollastonite in ceramic materials provides a favorable mineral formation, reduces the porosity thereof, increases the stability to temperature changes, improves the dielectric properties, decreases the shrinking during drying, lowers the finishing burn temperature, raises the thermal expansion coefficient (safety of the microflaw of glazing), and favorably influences the expansion due to moisture. In the compounding of glazing, the bubble formation due to carbon dioxide is avoided by the use of natural wollastonite.

It is an object of the invention to provide a commercially performable process for the production of pure synthetic crystalline beta wollastonite. Such a synthetic beta wollastonite should be substantially free of melting phases and of quartz.

Such a synthetic pure crystalline beta wollastonite which has a specific surface area of 1 to 100 and especially 3 to 100 sq.m./g., measured by the BET method, is provided by the invention. The BET method for the determination of the inner surface area is named by the authors, i.e. Brunauer, Emmet and Teller, and makes use of the adsorption of nitrogen at low temperatures. It is described in detail by Haul, Duembgen "Vereinfachte Methode zur Messung von Oberflachengröben durch Gasadsorption", Chemie-Ingenieur-Technik, 35 (1963), pp. 586–589, and in the book "Silikate" by Wilhelm Hinz, VEB-Verlag fuer Bauwesen, Berlin, 1963, page 340.

Another object of the invention is to provide a two-stage process for the production of pure, synthetic, crystalline beta-wollastonite.

In the first stage, calcium silicate hydrates with a $SiO_2/CaO$ molar ratio of about 0.7 to about 1.3, preferably about 1, are made by hydrothermal treatment of an aqueous mixture of a source of CaO and a source of $SiO_2$. In the second stage, these calcium silicate hydrates are transformed into beta wollastonite by annealing at about 800°C. to about 1150°C.

Depending on the $CaO/SiO_2$ molar ratio (C:S) of the starting mixtures and the conditions of formation, eleven different calcium hydrosilicates (CSH phases) occur in the system $Ca(OH)_2$—$SiO_2$—$H_2O$ (CSH). According to the present invention, the hydrothermal formation conditions are so selected that initially substantially quartz-free calcium silicate hydrates are formed which require a minimum of energy for the conversion into wollastonite.

This is particularly true of the CSH phases tobermorite $Ca_{10}[Si_{12}O_{31}](OH)_6$ and xonotlite $Ca_6[Si_6O_{17}](OH)_2$. These two CSH phases can be prepared from aqueous suspensions of commercially available calcium hydroxide and a $SiO_2$ source in a molar ratio of $SiO_2$:CaO of 0.7 to 1.3 and preferably about 1 under hydrothermal conditions.

The calcium oxide hydrate serving as one of the raw materials is desirable used in the form of commercially available white lime hydrate (having about 73% of CaO). Calcium oxide which, in the aqueous mixture, is transformed into calcium hydroxide may also be used. Suitable $SiO_2$ sources primarily include silicic acid ($H_2SiO_4$), condensed silicic acids ($SiO_2.XH_2O$) or the various modifications of silicon dioxide in finely pulverized state. Very good results are obtained with pure quartz dust having about 98% $SiO_2$.

The calcium oxide hydrate and the $SiO_2$ source, in a molar ratio of $SiO_2$:CaO of 0.7 to 1.3 and preferably about 1, in an aqueous suspension having a solids content of 30 to 80% by weight, are subjected to the hydrothermal treatment at temperatures of about 100° to 500°C, preferably 150° to 374°C., if necessary in an autoclave. Generally, 2 to 16 hours are required until the CSH phases desired are crystallized with a $SiO_2/CaO$ molar ratio of 0.7 to 1.3.

The formation of pure phases is favored by the addition to the starting mixtures to be treated of so-called mineralizers, i.e. soluble alkali and alkaline earth metal salts, especially sulfates, silicates, chlorides and fluorides, such as, for example, sodium chloride, calcium chloride, sodium fluoride, in an amount of 2 to 10%, based on the solids content of the starting mixtures to be subjected to hydrothermal treatment. When the process is carried out in an autoclave, the conditions of formation with respect to pressure, temperature and time are desirably balanced in such a manner that xonotlite and/or tobermorite are formed if products having a surface area which is not very large, i.e. up to about 30 sq.m./g., are desired. The formation of calcium hydrosilicates having these surface areas is favored by temperatures in excess of 204°C. and longer reaction periods of more than 4 hours.

If calcium hydrosilicates having very large surface areas and a wollastonite having a very large surface area are to be prepared, the latter from said calcium hydrosilicates, the conditions of the hydrothermal treatment are desirably selected in such a manner that the phases CSH I and CSH II are formed. This is promoted by mineralizers, which favor the dissolution of the quartz and the calcium hydroxide in the hydrothermal process and are partially incorporated in the crystal lattice as being the case, for example, with sodium fluoride. Moreover, low temperatures of, for example, 150° to 180°C and reaction periods of 2 to 4 hours contribute to the formation of said large surface area calcium hydrosilicates (CSH I and CSH II).

No $Ca(OH)_2$ could be detected radiographically in the hydrothermal products prepared in accordance with the invention. Moreover, they are almost free of quartz. However, for the production of a high quality, completely crystalline beta wollastonite having a very large surface area, it is entirely sufficient if these CSH phases contain less than 5% of quartz.

The hydrothermal products prepared in the manner described above and having a $SiO_2/CaO$ molar ratio of 0.7 to 1.3, especially about 1, such as the calcium hydrosilicates CSH I, CSH II, xonotlite and tobermorite, are subsequently dehydrated by annealing at temperatures of 800° to 1150°C to form beta wollastonite. Since hydrosilicates of the composition mentioned above are converted in practice into beta wollastonite at temperatures of as low as 800° to 850°C., these lower annealing temperatures are preferred if wollastonite having a very large surface area of 30 sq.m./g. and more is to be produced. Annealing temperatures in excess of 1000°C. are desirable for the production of wollastonite having a small surface area.

The duration of annealing or burning, as is generally known, depends upon the size of the particles of the hydrothermal products to be dehydrated and the quantity to be converted by burning. The surface area of the wollastonite produced is reduced as the duration of burning increases.

Since both hydrothermally produced calcium silicate hydrates and the novel synthetic beta wollastonite are obtained as rather voluminous masses, it is recommendable, above all for use in ceramic industry, to form shaped bodies such as tablets, pellets or briquettes of the calcium silicate hydrates by pressing prior to annealing. Products of higher density and lower bulk weight are also obtained by compressing in this manner the voluminous beta wollastonite already produced and then firing it again. Molding pressures of 200 to 800 kgs./sq.cm. are found to be adequate in general.

Quartz-free fired products and, consequently, pure beta wollastonite are formed from almost quartz-free hydrothermal products. β-Wollastonite does not differ in chemical composition and mineral structure from high quality natural wollastonite, but has a specific BET surface area of 1 to 100 sq.m./g, especially 3 to 100 sq.m./g. and, accordingly, consists of substantially smaller crystals having a particle size of only 0.01 to 2 μ. The specific surface area is at least ten times that of natural wollastonite having been finely ground with high mechanical expense.

Synthetic wollastonites produced via the melting phase also do not have such fineness. Moreover, their $SiO_2$ content is higher than the stoichiometric ratio of $SiO_2/CaO = 1$ and they have considerable portions of non-crystalline melting phases.

In Table 1, chemical analytical data, BET surface areas and X-ray analyses of comparable natural and synthetic wollastonites are shown.

TABLE 1

| | HCl-Insoluble, % | Soluble $SiO_2$ % | Total CaO* % | CaO free % | BET $m^2/g$. | X-ray Analysis |
|---|---|---|---|---|---|---|
| Natural Wollastonite | 5.71 | 46.67 | 44.84 | 0.21 | 0.57 | β-Wollastonite (Quartz) |
| Synthetic Wollastonite from CSH phases | 2.72 | 47.37 | 46.91 | 0.14 | 4.37 | β-Wollastonite |
| Synthetic Wollastonite from the melt (Synopal 1) | 88.30 | 6.05 | 4.10 | 0.28 | 0.51 | quartz-cristobalite |
| Synthetic Wollastonite from the melt (Synopal 2) | 26.24 | 36.43 | 26.03 | 0.35 | 0.50 | amorphous to X-rays |

*In the HCl-soluble portion

It will be noted that, except for the BET surface area, natural wollastonite and the β-wollastonite according to the invention are alike while the melting products Synopal 1 and 2 differ considerably in their chemical and mineral composition.

It is possible by the process of the invention to produce a synthetic wollastonite from readily accessible raw materials which are available in large quantities by readily controllable process steps, the wollastonite so produced being superior with respect to the range and fields of application to natural wollastonite and the synthetic wollastonites produced through the melting phase. Because of its fine-crystalline structure and the extreme fineness of its particles, the novel synthetic crystalline wollastonite which has a very large surface ares is useful as filler in plastic industry and, due to its high whiteness, it is also useful as pigment for the production of paints. For use in ceramic industry, especially for the manufacture of ceramic tiles and wall plates, those grades of the synthetic wollastonite which have surface areas below 30 sq.m./g. are preferred. In addition of all advantages of natural wollastonite, they permit additionally a substantial reduction in sintering temperature. Thus, pure white ceramically bound platelets can be made from the present wollastonite, without the addition of ball clay or sintering aids, at firing temperatures of as low as about 1200°C. whereas the best types of natural wollastonite require temperatures above 1500°C. At 1200°C. the products made from natural wollastonite are still unsintered and exhibit a light brown discoloration due to impurities (presumably $Fe_2O_3$). Highgrade ceramic molded bodies can also be obtained if the calcium hydrosilicates produced in the first stage of the instant process and having a $SiO_2/CaO$ molar ratio of 0.7 to 1.3, preferably tobermorite or xonotlite, are processed with or without the addition of ball clay and other sintering aids by ceramic working processes, the synthetic wollastonite being then formed during the burning or annealing process.

To achieve higher green density, the hydrosilicates mentioned above or the pure, crystalline synthetic beta wollastonite made therefrom according to the invention may first be sintered by firing at 1150° to 1250°C. as in the process of making fire clay, reduced again to small pieces and then processed to ceramic materials in conventional manner.

The following are illustrative but non-limitative examples of the invention.

EXAMPLE 1

6.66 Kilograms of commercially available white calcium hydroxide containing about 96% by weight of CaO, based on substance having no loss on ignition, 5.28 kgs. of quartz dust having a BET surface area of about 4 sq.m./g. and containing 98% by weight of $SiO_2$, and 0.24 kgs. of sodium fluoride are thoroughly mixed in a ceramic ball mill with addition of 17.86 kgs. of water. The slurry is filled into stainless steel molds and subjected to hydrothermal treatment in an autoclave for 3 hours with 17 atmospheres of saturated steam corresponding to 204°C.

After the treatment in the autoclave, the porous and brittle mass which consists predominantly of the phases CSH I and CSH II is dried at 150°C. and crushed to particle sizes of less than 20 mm. This product has a specific BET surface area of about 90 sq.m./g. It is then dehydrated in a tunnel furnace at 800°C. for 6 hours to form wollastonite. The granular product obtained after firing is very brittle and is readily crushed.

The synthetic wollastonite produced in this manner has a very high whiteness of 93% as compared with standard white of MgO and a specific surface area of 81 sq.m./g. This synthetic wollastonite is excellently suited as filler for plastic materials and as white pigment for coating compositions and paints.

EXAMPLE 2

To produce 1,000 kgs. of wollastonite, 666 kgs. of commercially available white calcium hydroxide containing about 96% of CaO and 528 kgs. of quartz dust (2 sq.m./g.) containing about 98% of $SiO_2$ are mixed for about 20 minutes in a ceramic ball mill while adding 1786 kgs. of water. The slurry is then pumped into a portable mixer and cast into steel molds after mixing. The filled steel molds are stacked on lorries and moved into an autoclave where calcium silicate hydrate is formed in 12 hours at 16 kgs./sq.cm. gauge of saturated steam corresponding to 204°C.

After the treatment in the autoclave, the porous brittle mass of calcium silicate hydrate is dried at 150°C. and crussed to form particles smaller than 20 mm. The crushed material is then compressed in a press at about 400 kgs./sq.cm. to form parallelepiped blocks of 11.5 cm. × 24 cm. × 7.1 cm., stacked on the tunnel furnace car and fired in a tunnel furnace for 8 hours at 1050°C. to form wollastonite.

The brittle wollastonite blocks obtained after firing can be readily crushed to the fineness desired. This product has a whiteness of about 93% as compared with standard whiteness of magnesia. The BET specific surface area is 1.3 sq.m./g.

As may be seen from the following example, wollastonite produced in the manner described, in connection with other conventional raw materials, is very well suited for the manufacture of ceramic products such as, for example, wall tiles, sanitary porcelain and glazings.

EXAMPLE 3

A mixture of 70% by weight of wollastonite produced according to Example 2 and 30% by weight of kaolin was mixed with about 15% of water and compressed under a pressure of 100 kgs./sq.cm. to form a tile of 4 × 16 × 0.5 cm. The tile was fired for 3 hours at 1125°C., the heating rate being 400°C./hr. Shrinkage on firing was 0.8%. After firing, the ceramic body had a water absorption of 26% and an expansion by moisture of only 0.0017%.

EXAMPLE 4

A glazing of a sintered body prepared with the use of 8.6% of the synthetic wollastonite according to Example 2 exhibited more rapid levelling as compared with the same glazing which, however, had been prepared with the use of natural wollastonite. The firing temperature could be lower by 1 to 1 ½ Seger cones. The finished glazing prepared with the use of the synthetic wollastonite was completely free of pores and pinholes.

What is claimed is:

1. The pure, synthetic, crystalline beta wollastonite having a BET specific surface area of 3 to 100 sq. m./g. and a crystal particle size of 0.01 to 2 milli-microns, which is the product made in accordance with the process which comprises subjecting an aqueous suspension of calcium oxide hydrate and a source of $SiO_2$ in a molar ratio of $SiO_2$:CaO of about 0.7 to about 1.3 to hydrothermal treatment in the range of about 100°C. to about 500°C. to produce calcium silicate hydrates having a $SiO_2$/CaO molar ratio of about 0.7 to about 1.3 and annealing the calcium silicate hydrates at about 800°C. to about 1150°C. to dehydrate the same to the substantially pure, crystalline beta wollastonite.

* * * * *